United States Patent [19]
Morikawa et al.

[11] Patent Number: 5,499,000
[45] Date of Patent: Mar. 12, 1996

[54] HIGH-FREQUENCY SWITCH

[75] Inventors: Takehiko Morikawa, Takefu; Kazuhiro Iida, Fukui, both of Japan

[73] Assignee: Murata Manufacturing Co., Ltd., Japan

[21] Appl. No.: 442,324

[22] Filed: May 16, 1995

[30] Foreign Application Priority Data

May 17, 1994 [JP] Japan .................................. 6-128397

[51] Int. Cl.$^6$ .................................................. H01P 1/15
[52] U.S. Cl. .............................................. 333/104; 455/83
[58] Field of Search ................................... 333/103, 104; 455/78, 80, 82, 83

[56] References Cited

U.S. PATENT DOCUMENTS 5,054,114  10/1991  Erickson ........................... 333/103 X
5,442,812  8/1995  Ishizaki et al. ...................... 333/104 X

FOREIGN PATENT DOCUMENTS 108301  4/1990  Japan .................................. 333/104

Primary Examiner—Paul Gensler
Attorney, Agent, or Firm—Ostrolenk, Faber, Gerb & Soffen

[57] ABSTRACT

A high-frequency switch 20 includes a first diode 24. An anode of the first diode 24 is connected to a transmitting circuit TX via a capacitor 22, and is grounded via a first strip line 26 and a capacitor 28. A first control terminal 30 is connected to a connecting point of the first strip line 26 and the capacitor 28, and a control circuit for switching the high-frequency switch is connected to the first control terminal 30. A cathode of the first diode 24 is connected to an antenna ANT via a capacitor 32. One end of a second strip line 40 is connected to the antenna ANT via the capacitor 32. The end of the second strip line 40 is grounded via a capacitor 42. The other end of the second strip line 40 is connected to a receiving circuit RX via a capacitor 44, and is grounded via a second diode 46 and a capacitor 48.

4 Claims, 12 Drawing Sheets

FIG.10
PRIORT ART

PRIOR ART

FIG.13

REFLECTION CHARACTERISTIC BETWEEN ANTENNA
AND RECEIVING CIRCUIT AT RECEIVING

000
HIGH-FREQUENCY SWITCH

BACKGROUND OF THE INVENTION

1. Field of the Invention

The present invention relates to a high-frequency switch, and particularly, relates to a high-frequency switch for switching a signal path in a high-frequency circuit, for example, a digital portable telephone or the like.

2. Description of the Prior Art

Figure 8:
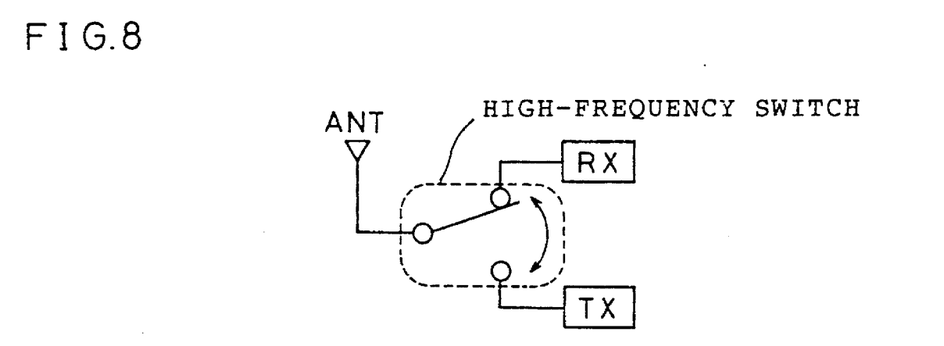
FIG. 8 is an illustrative view showing a function of a high-frequency switch.

As shown in FIG. 8, a high-frequency switch is used for switching a connection between a transmitting circuit TX and an antenna ANT and a connection between a receiving circuit RX and the antenna ANT in a digital portable telephone or the like.

Figure 9:
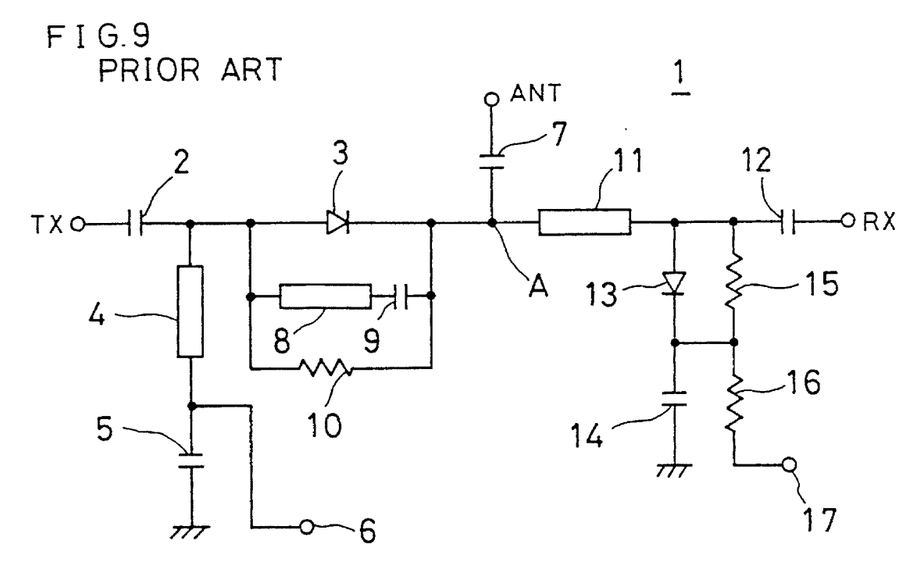
FIG. 9 is a circuit diagram showing one example of a high-frequency switch which is a background of the present invention.

FIG. 9 is a circuit diagram showing one example of a high-frequency switch which is a background of the present invention. The high-frequency switch 1 is connected to an antenna ANT, a transmitting circuit TX and a receiving circuit RX. An anode of a first diode 3 is connected to the transmitting circuit TX via a capacitor 2. The anode of the first diode 3 is grounded via a series circuit of a first strip line 4 and a capacitor 5. A first control terminal 6 is connected to a connecting point of the first strip line 4 and the capacitor 5. A control circuit for switching the high-frequency switch is connected to the first control terminal 6. Also, a cathode of the first diode 3 is connected to the antenna ANT via a capacitor 7. A series circuit of a strip line 8 as an inductor and a capacitor 9, and a resistor 10 are connected to the first diode 3 in parallel. Furthermore, one end of a second strip line 11 is connected to the antenna ANT via the capacitor 7. The other end of the second strip line 11 is connected to the receiving circuit RX via a capacitor 12. An anode of a second diode 13 is connected to a connecting point of the second strip line 11 and the capacitor 12. A cathode of the second diode 13 is grounded via a capacitor 14. A resistor 15 is connected to the second diode 13 in parallel. Furthermore, a second control terminal 17 is connected to the cathode of the second diode 13 via another resistor 16. Another control circuit for switching the high-frequency switch is connected to the second control terminal 17.

Figure 10:
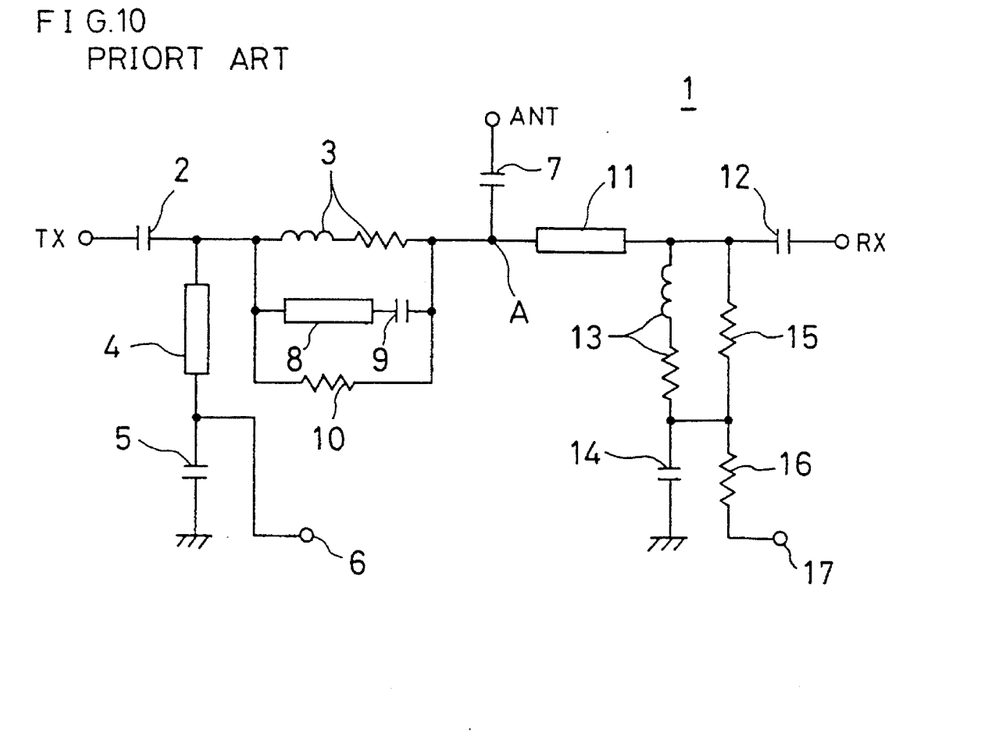
FIG. 10 is an equivalent circuit diagram at transmitting in the high-frequency switch shown in FIG. 9.

When transmitting with the high-frequency switch 1 shown in FIG. 9, a positive voltage is applied to the first control terminal 6 so that the potential of the first control terminal 6 becomes higher than that of the second control terminal 17. At this time, a D.C. component is blocked by the capacitors 2, 5, 7, 12 and 14, so that the voltage applied to the first control terminal 6 is applied to only a circuit including the first diode 3 and the second diode 13. Thus, by the voltage, the first diode 3 and the second diode 13 are turned ON. When the first diode 3 and the second diode 13 are ON, a signal from the transmitting circuit TX is transmitted to the antenna ANT, and then the signal is transmitted from the antenna ANT. Also, at this time, as showing an equivalent circuit when the first diode 3 and the second diode 13 are ON in FIG. 10, inductance components exist in the first diode 3 and the second diode 13. Thus, the transmitting signal from the transmitting circuit TX is not transmitted to the receiving circuit RX, since the second strip line 11 is grounded via the second diode 13 and the capacitor 14 and resonates, and an impedance observed from the connecting point A to the receiving circuit RX side is infinite.

On the other hand, when receiving, the voltage is not applied to the first control terminal 6 and a positive voltage is applied to the second control terminal 17, so that the first diode 3 and the second diode 13 are turned OFF. Thus, a receiving signal is transmitted to the receiving circuit RX and is not transmitted to the transmitting circuit TX side.

In this way, in the high-frequency switch 1, by controlling voltages applied to the first control terminal 6 and the second control terminal 17, transmitting and receiving can be switched.

Figure 11:
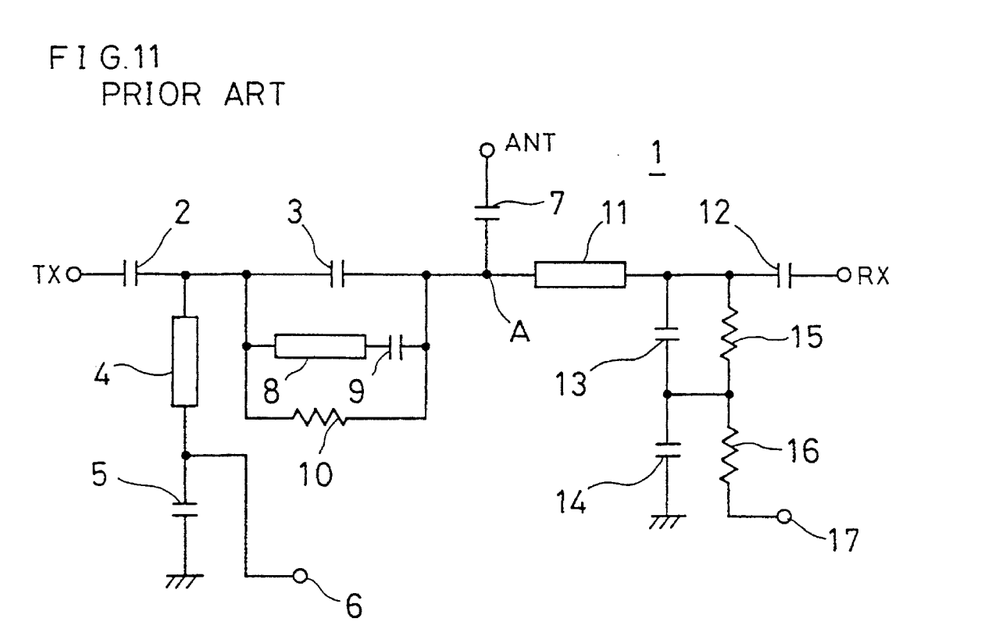
FIG. 11 is an equivalent circuit diagram at receiving in the high-frequency switch shown in FIG. 9.
Figure 12:
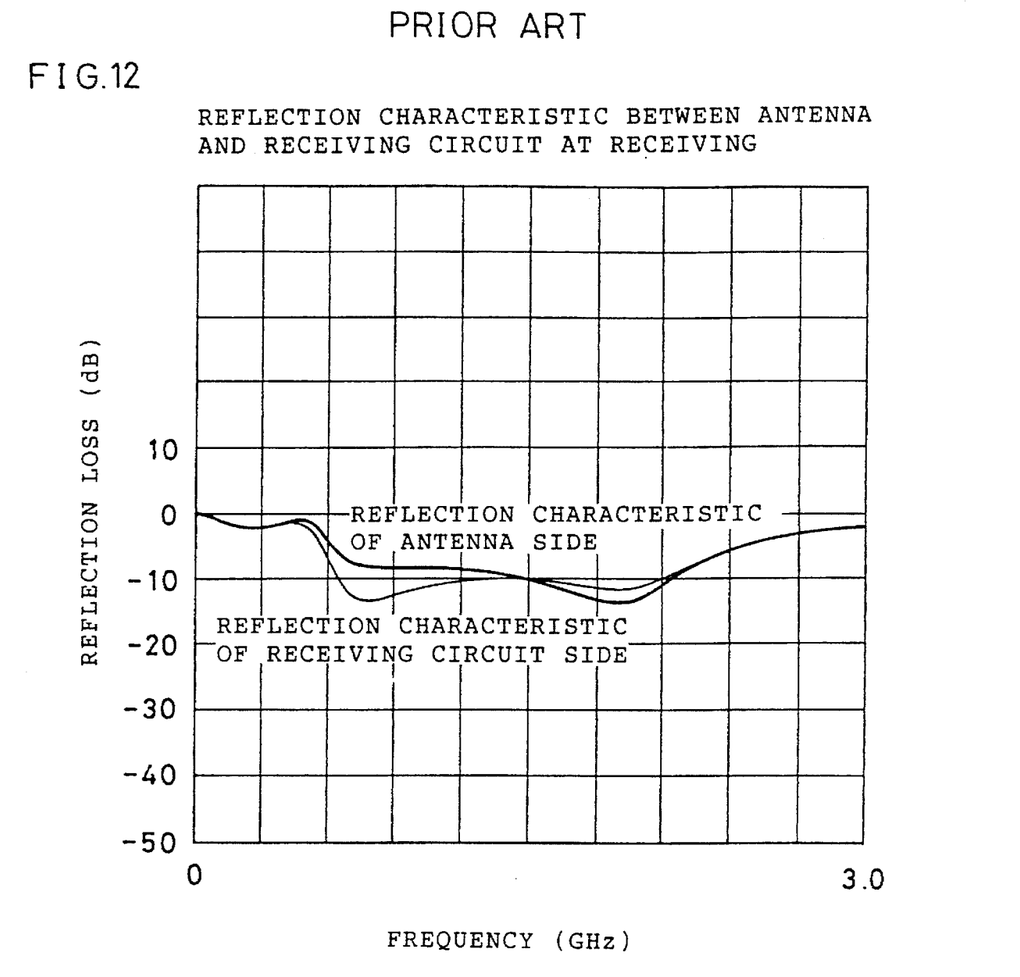
FIG. 12 is a graph showing a reflection characteristic between an antenna and a receiving circuit at receiving in the high-frequency switch shown in FIG. 9.

However, in the conventional high-frequency switch 1 shown in FIG. 9, when receiving, as showing an equivalent circuit when the first diode 3 and the second diode 13 are OFF in FIG. 11, capacitance components exist in the first diode 3 and the second diode 13. When such a capacitance component exists in the second diode 13, since the other end of the second strip line 11 is grounded via the capacitance component, the characteristic impedance of the second strip line 11 becomes low and does not match with the impedance of the receiving circuit RX side. Thus, in the high-frequency switch 1, as showing a reflection characteristic between the antenna and the receiving circuit at receiving in FIG. 12, there is a problem that a reflection loss at receiving is large and an insertion loss at receiving is large as 1.0 dB.

Figure 13:
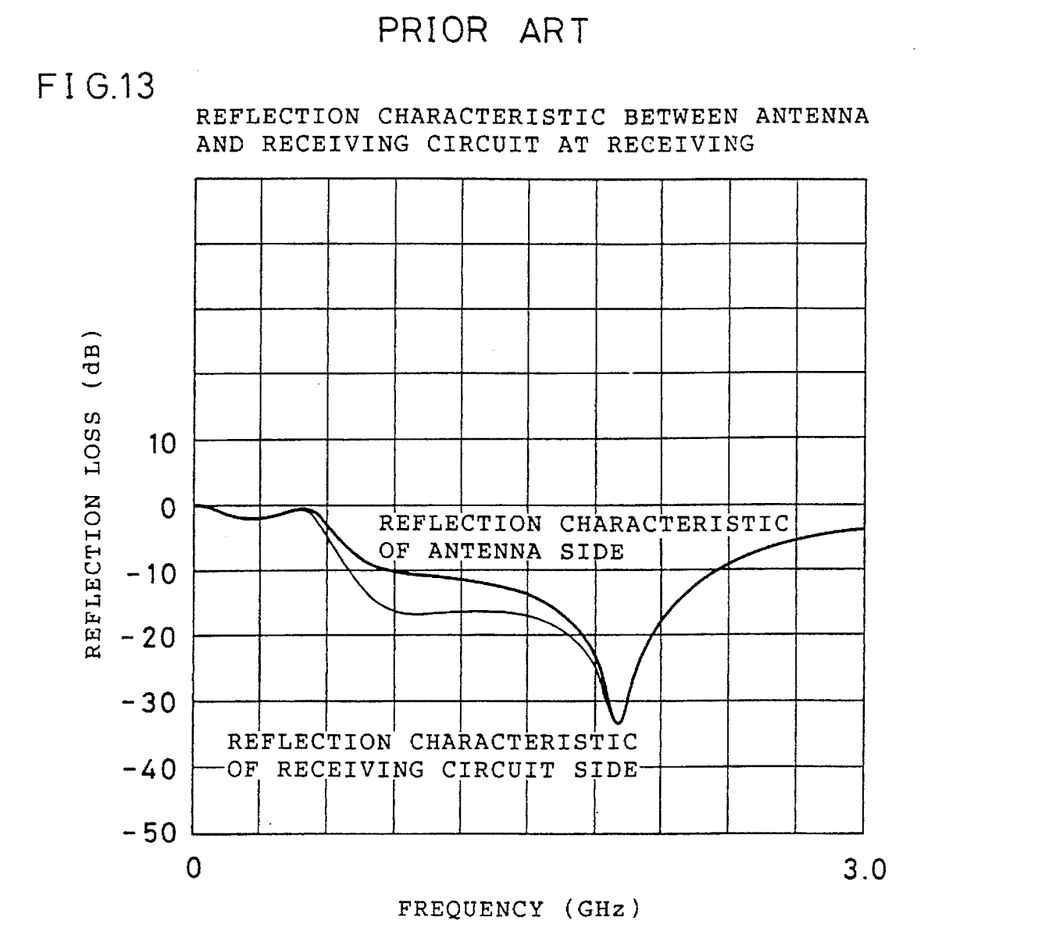
FIG. 13 is a graph showing a reflection characteristic between the antenna and the receiving circuit at receiving when a second diode and so on are removed from the high-frequency switch shown in FIG. 9.

Meanwhile, in the high-frequency switch 1, when the second diode 13, the capacitor 14, the resistors 15 and 16 are removed for decreasing the insertion loss at receiving, as showing a reflection characteristic between the antenna and the receiving circuit at receiving in FIG. 13, though the reflection loss and the insertion loss become small at receiving, it is not used for a high-frequency switch since a signal flows to the receiving circuit RX side at transmitting.

SUMMARY OF THE INVENTION

Therefore, it is a primary object of the present invention to provide a high-frequency switch wherein an insertion loss at receiving can be decreased.

The present invention relates to a high-frequency switch connected to a transmitting circuit, a receiving circuit and an antenna, for switching a connection between the transmitting circuit and the antenna and a connection between the receiving circuit and the antenna, comprising a first diode whose anode is connected to the transmitting circuit side and whose cathode is connected to the antenna side, a strip line connected between the antenna and the receiving circuit, a second diode whose anode is connected to the receiving circuit side and whose cathode is connected to a grounding side, and a capacitor connected between one end of the strip line at the antenna side and the grounding.

When transmitting, a forward voltage is applied to the first diode and the second diode, so that the first diode and the second diode are turned ON. Thus, a signal from the transmitting circuit is transmitted to the antenna via the first diode, and the signal is transmitted from the antenna. Also, at this time, the transmitting signal from the transmitting circuit is not transmitted to the receiving circuit, since the strip line is grounded via the second diode and resonates, and an impedance observed from the antenna side to the receiving circuit side is infinite.

On the other hand, when receiving, a reverse voltage is applied to the first diode and the second diode, so that the first diode and the second diode are turned OFF. At this time, a capacitance component exists in the second diode, and the other end of the strip line is grounded via the capacitance component of the second diode. Thus, the characteristic impedance of the strip line will be decreased by the capacitance component of the second diode. However, since the end of the strip line is grounded via the capacitor, the characteristic impedance of the strip line is amended so as to increase by the capacitance of the capacitor at a prescribed frequency. Thus, when the capacitance of the capacitor is adjusted, the characteristic impedance of the strip line can match with the impedance of the receiving circuit side at the prescribed frequency, and the insertion loss at receiving can be decreased.

According to the present invention, a high-frequency switch is obtained wherein the insertion loss at receiving can be decreased.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
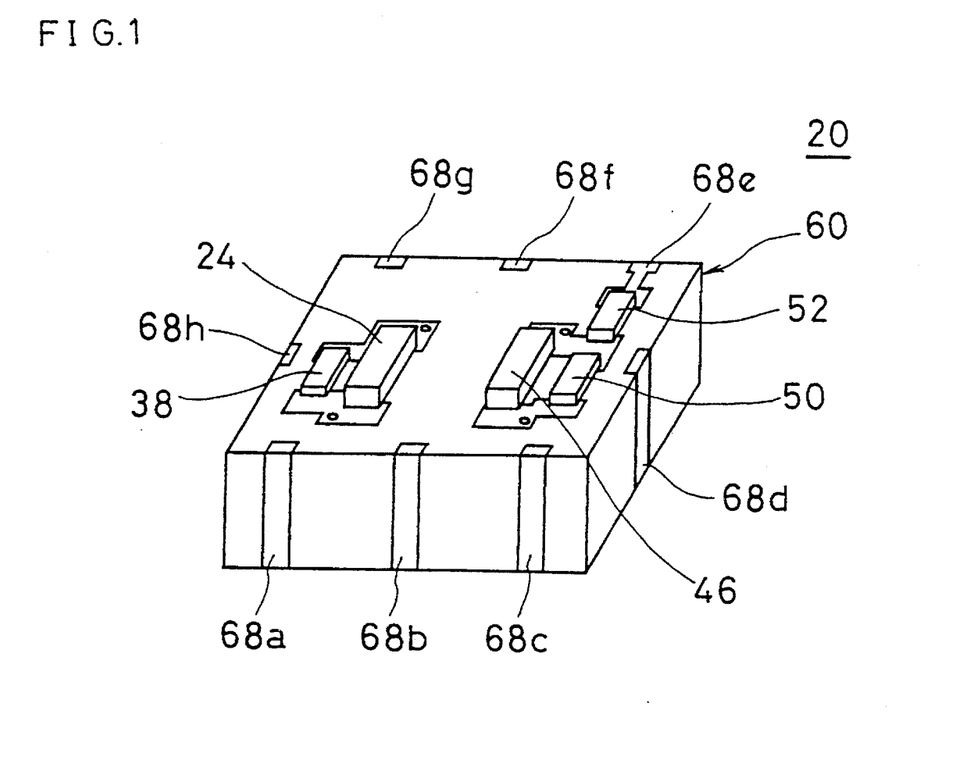
FIG. 1 is a perspective view showing one embodiment of the present invention.
Figure 2:
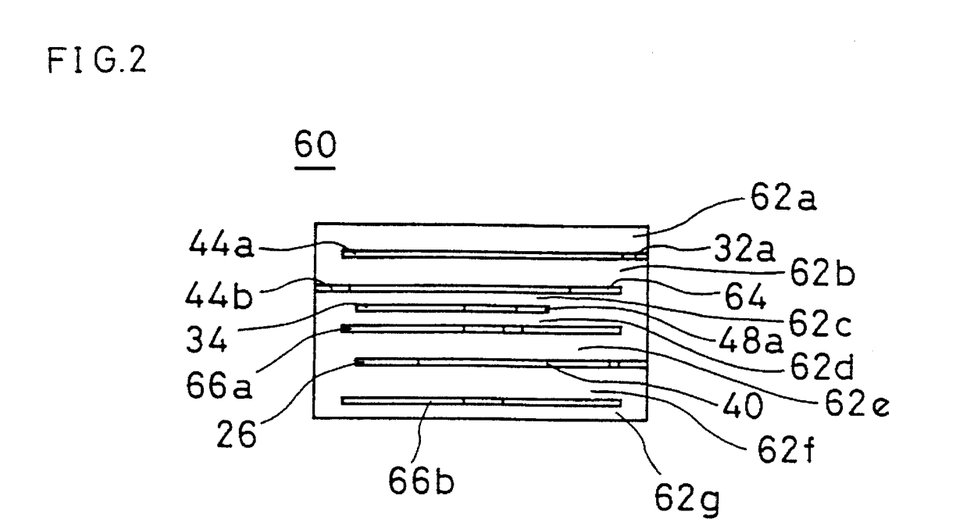
FIG. 2 is an illustrative view of a laminate used in the embodiment shown in FIG. 1.
Figure 3:
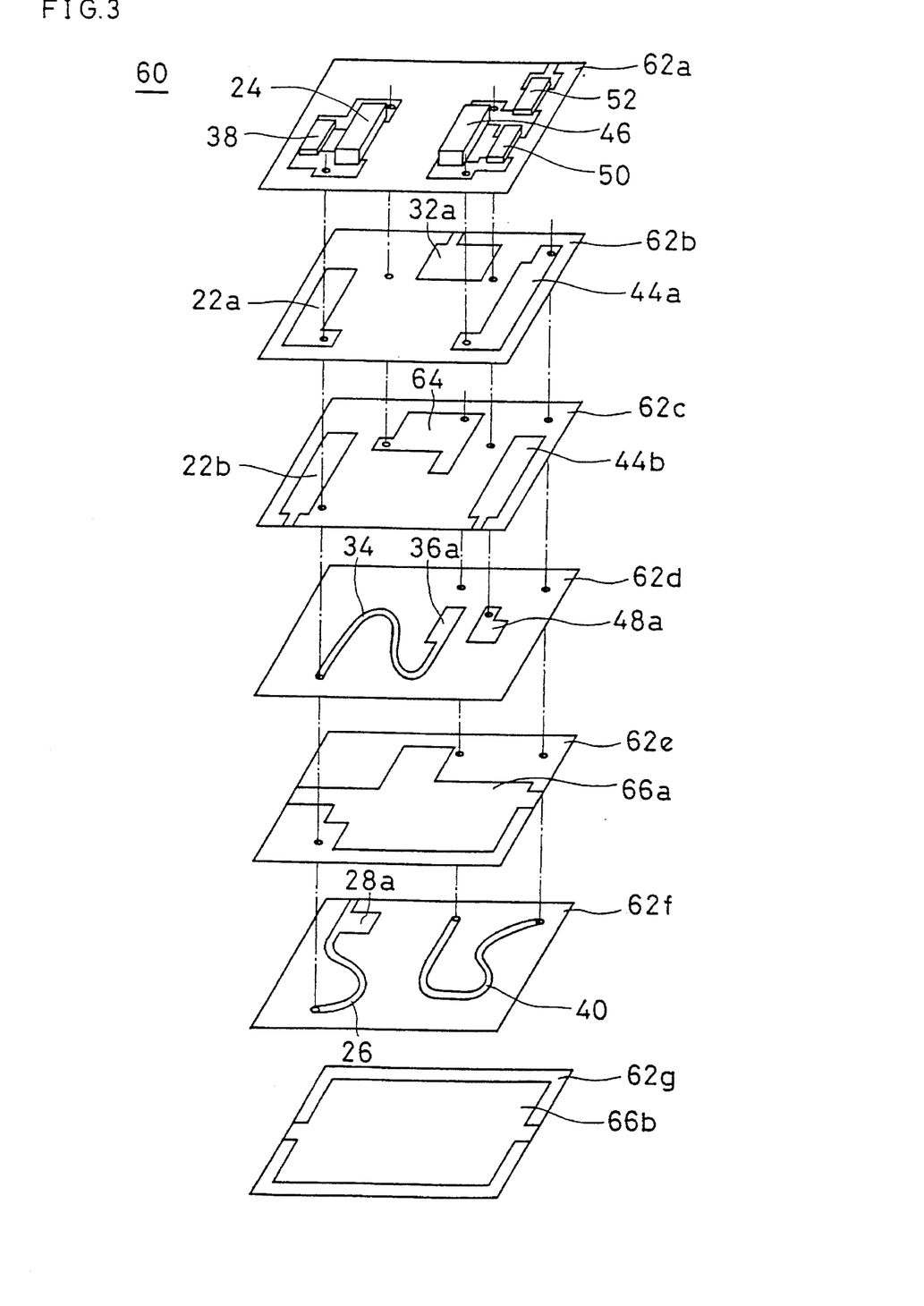
FIG. 3 is an exploded perspective view of the laminate shown in FIG. 2.
Figure 4:
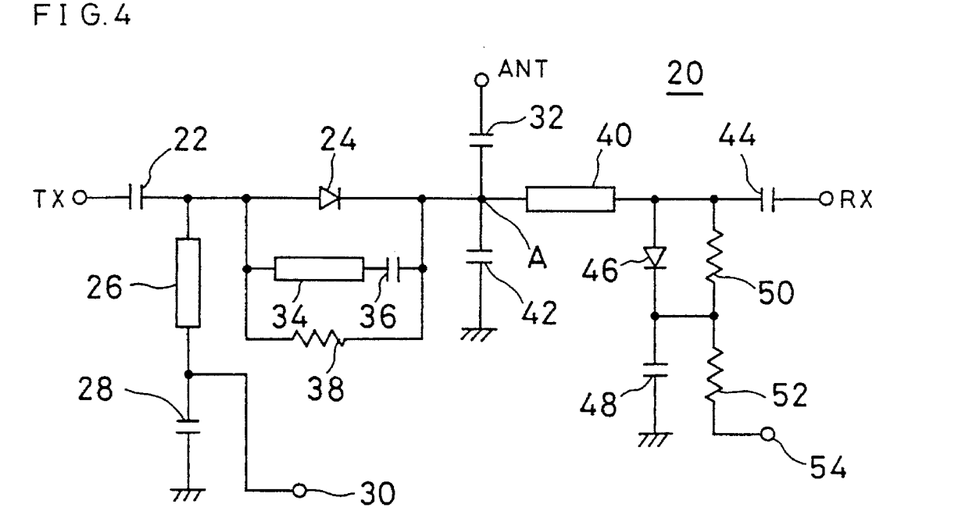
FIG. 4 is a circuit diagram of the embodiment shown in FIG. 1.

FIG. 1 is a perspective view showing one embodiment of the present invention, FIG. 2 is an illustrative view of a laminate used in the embodiment, FIG. 3 is an exploded perspective view of the laminate, and FIG. 4 is a circuit diagram of the embodiment. Though the high-frequency switch of the embodiment is characterized by its laminated structure and circuit, since a high-frequency switch according to the present invention is characterized by its circuit, firstly, the circuit of the high-frequency switch of the embodiment will be described with reference to FIG. 4.

The high-frequency switch 20 is connected to an antenna ANT, a transmitting circuit TX and a receiving circuit RX. An anode of a first diode 24 is connected to the transmitting circuit TX via a capacitor 22. The anode of the first diode 24 is grounded via a series circuit of a first strip line 26 and a capacitor 28. A first control terminal 30 is connected to a connecting point of the first strip line 26 and the capacitor 28. A control circuit for switching the high-frequency switch is connected to the first control terminal 30. Also, a cathode of the first diode 24 is connected to the antenna ANT via a capacitor 32. A series circuit of a strip line 34 as an inductor and a capacitor 36, and a resistor 38 are connected to the first diode 24 in parallel. Furthermore, one end of a second strip line 40 is connected to the antenna ANT via the capacitor 32. Also, the end of the second strip line 40 is grounded via a capacitor 42. The other end of the second strip line 40 is connected to the receiving circuit RX via a capacitor 44. Also, an anode of a second diode 46 is connected to an intermediate point of the second strip line 40 and the capacitor 44. A cathode of the second diode 46 is grounded via a capacitor 48. Also, a resistor 50 is connected to the second diode 46 in parallel. Furthermore, a second control terminal 54 is connected to the cathode of the second diode 46 via another resistor 52. Another control circuit for switching the high-frequency switch is connected to the second control terminal 54.

Next, the laminated structure of the high-frequency switch 20 will be described with reference to FIG. 1, FIG. 2, FIG. 3 and so on. As shown particularly in FIG. 1, the high-frequency switch 20 includes a multi-layer board or a laminate 60. As shown in FIG. 2 and FIG. 3, the laminate 60 is formed by laminating many dielectric layers 62a–62g and so on.

On the top dielectric layer 62a, each land is formed. The first diode 24, the second diode 46, the resistors 38, 50 and 52 are connected to the lands.

On the second dielectric layer 62b, one electrode 22a of the capacitor 22, one electrode 32a of the capacitor 32 and one electrode 44a of the capacitor 44 are formed.

On the third dielectric layer 62c, the other electrode 22b of the capacitor 22, an electrode 64 including the other electrode of the capacitor 32 and the other electrode 44b of the capacitor 44 are formed.

On the fourth dielectric layer 62d, the strip line 34 as an inductor, one electrode 36a of the capacitor 36 and one electrode 48a of the capacitor 48 are formed.

On the fifth dielectric layer 62e, a first grounding electrode 66a is formed.

On the sixth dielectric layer 62f, the first strip line 26, one electrode 28a of the capacitor 28 and the second strip line 40 are formed.

On the bottom dielectric layer 62g, a second grounding electrode 66b is formed.

Then, one end of the first diode 24 and one end of the resistor 38 are connected to the electrode 22a, one end of the strip line 34 and one end of the first strip line 26 through via-holes formed to the dielectric layers 62a–62e.

Also, the other end of the first diode 24 and the other end of the resistor 38 are connected to the electrode 64 through via-holes formed to the dielectric layers 62a and 62b.

Furthermore, the electrode 64 is connected to one end of the second strip line 40 through via-holes formed to the dielectric layers 62c–62e.

Also, one end of the second diode 46 and one end of the resistor 50 are connected to the electrode 44a through a via-hole formed to the dielectric layer 62a.

Furthermore, the other end of the second diode 46, the other end of the resistor 50 and one end of the resistor 52 are connected to the electrode 48a through via-holes formed to the dielectric layers 62a–62c.

Also, the electrode 44a is connected to the other end of the second strip line 40 through via-holes formed to the dielectric layers 62b–62e.

On side surfaces of the laminate 60, as shown in FIG. 1, eight external electrodes 68a–68h are formed. In this case, the external electrode 68a is connected to the electrode 22b. The external electrode 68a is connected to the transmitting circuit TX. Also, the external electrode 68c is connected to the electrode 44b. The external electrode 68c is connected to the receiving circuit RX. Furthermore, the external electrodes 68d and 68h are connected to the first grounding electrode 66a and the second grounding electrode 66b. The external electrodes 68d and 68h are used as grounding terminals. Also, the external electrode 68e is connected to a land connected to the other end of the resistor 52. The external electrode 68e is used as the second control terminal 54. Furthermore, the external electrode 68f is connected to the electrode 32a. The external electrode 68f is connected to the antenna ANT. Also, the external electrode 68g is connected to the other end of the first strip line 26 and the electrode 28a. The external electrode 68g is used as the first control terminal 30. Meanwhile, the external electrode 68b is not connected to an electrode or a strip line.

Then, the capacitor 22 is formed between the electrode 22a and the electrode 22b, the capacitor 28 is formed between the electrode 28a and the first and the second grounding electrodes 66a and 66b, the capacitor 32 is formed between the electrode 32a and the electrode 64, the capacitor 36 is formed between the electrode 36a and the electrode 64, the capacitor 42 is formed between the electrode 64 and the first grounding electrode 66a, the capacitor 44 is formed between the electrode 44a and the electrode 44b, and the capacitor 48 is formed between the electrode 48a and the first grounding electrode 66a.

Thus, the high-frequency switch 20 shown in FIG. 1 has a circuit shown in FIG. 4.

When transmitting with the high-frequency switch 20, a positive voltage is applied to the first control terminal 30 so that the potential of the first control terminal 30 becomes higher than that of the second control terminal 54. The voltage applied to the first control terminal 30 is applied to the first diode 24 and the second diode 46 as a forward direction bias voltage. Thus, the first diode 24 and the second diode 46 are turned ON. Accordingly, the transmitting signal from the transmitting circuit TX is transmitted from the antenna ANT, and is not transmitted to the receiving circuit RX side, since the second strip line 40 is grounded by the second diode 46 and resonates, and an impedance observed from the connecting point A to the receiving circuit RX side is infinite.

Figure 5:
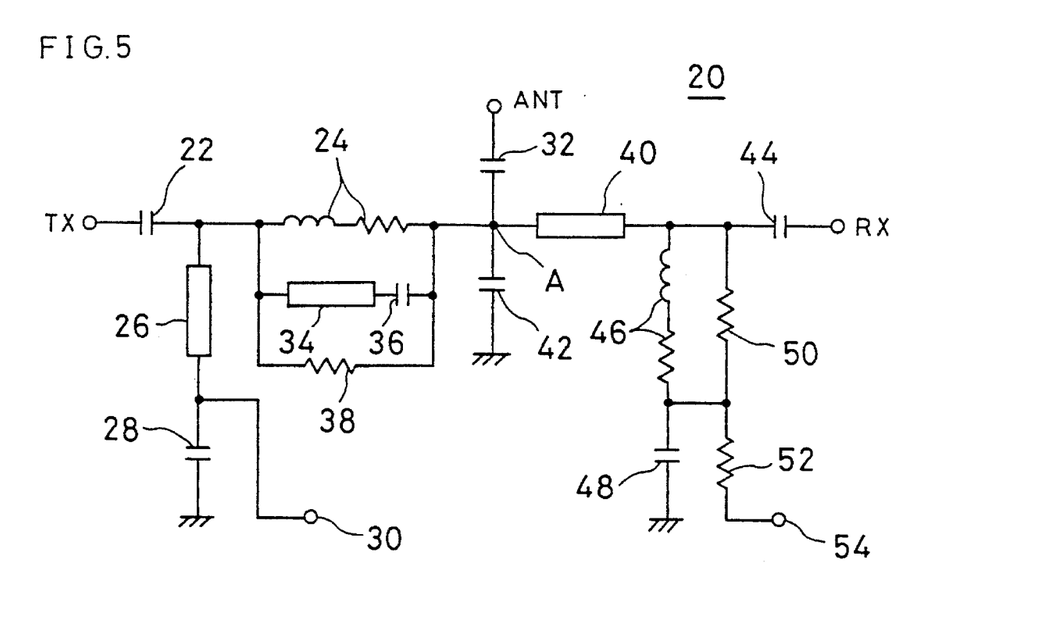
FIG. 5 is an equivalent circuit diagram at transmitting in the embodiment shown in FIG. 1.

In the high-frequency switch 20, when transmitting, as showing an equivalent circuit when the first diode 24 and the second diode 46 are ON in FIG. 5, inductance components exist in the first diode 24 and the second diode 46. When such an inductance component exists in the second diode 46, the impedance observed from the connecting point A of the antenna ANT and the second strip line 40 to the receiving circuit RX side is not infinite. In order to remove the influence of such an inductance component, a series resonance circuit is formed with the inductance component of the second diode 46 and the capacitor 48. Thus, a capacitance C of the capacitor 48 is shown in the following equation wherein $L_D$ presents the inductance component of the second diode 46, and f presents an operating frequency.

$$C=1/\{(2\pi f)^2 L_D\}$$

By setting the capacitance C of the capacitor 48 in a condition defined by the above equation, when the second diode 46 is ON, the series resonance circuit is formed, and the impedance observed from the connecting point A of the antenna ANT and the second strip line 40 to the receiving circuit RX side can be infinite. Thus, the signal from the transmitting circuit TX is not transmitted to the receiving circuit RX, so that an insertion loss between the transmitting circuit TX and the antenna ANT can be decreased. Furthermore, between the antenna ANT and the receiving circuit RX, a good isolation can be obtained. Meanwhile, when a voltage is applied to the first control terminal 30, a direct current is blocked by the capacitors 22, 28, 32, 44 and 48, so that it flows to only a circuit including the first diode 24 and the second diode 46, and does not influence other portions.

Also, when receiving with the high-frequency switch 20, the voltage is not applied to the first control terminal 30, and a positive voltage is applied to the second control terminal 54. The voltage applied to the second control terminal 54 is divided by the resistors 38, 50 and so on, and applied to the first diode 24 and the second diode 46 as a reverse direction bias voltage. Thus, the first diode 24 and the second diode 46 are reliably kept in their OFF state. Accordingly, a receiving signal is transmitted to the receiving circuit RX.

Figure 6:
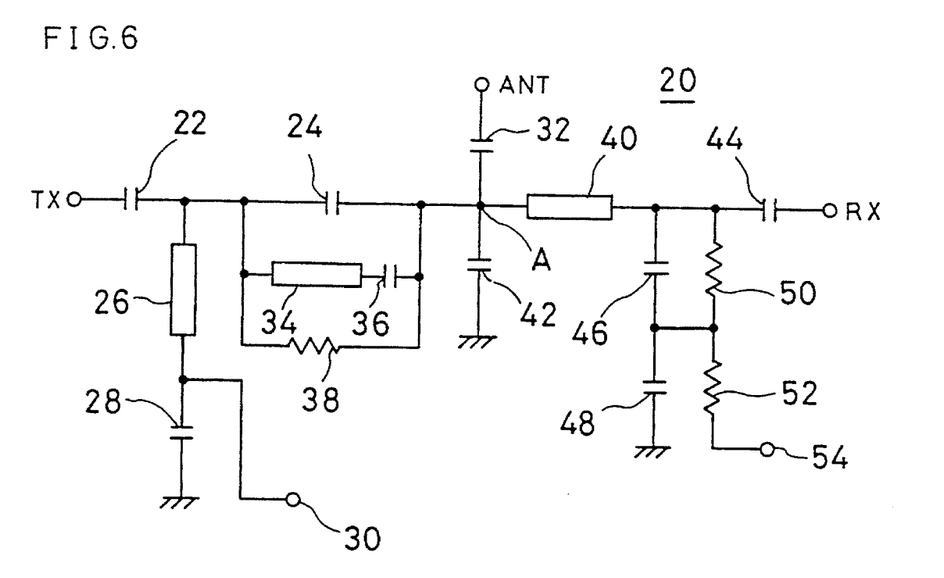
FIG. 6 is an equivalent circuit diagram at receiving in the embodiment shown in FIG. 1.

In the high-frequency switch 20, when receiving, as showing an equivalent circuit when the first diode 24 and the second diode 46 are OFF in FIG. 6, capacitance components exist in the first diode 24 and the second diode 46. When such a capacitance component exists in the first diode 24, there is a possibility of the receiving signal flowing to the transmitting circuit TX side. However, in the high-frequency switch 20, the strip line 34 as an inductor is connected to the first diode 24 in parallel. A parallel resonance circuit is formed with the inductance component of the strip line 34 and the capacitance component of the first diode 24. Thus, an inductance L of the strip line 34 is shown in the following equation wherein $C_D$ presents the capacitance of the first diode 24, and f presents an operating frequency.

$$L=1/\{(2\pi f)^2 C_D\}$$

By setting the inductance L of the strip line 34 in a condition defined by the above equation, when the first diode 24 is OFF, the parallel resonance circuit can be formed, and a good isolation can be obtained between the antenna ANT and the transmitting circuit TX. Thus, the receiving signal does not flow to the transmitting circuit TX side, so that the insertion loss between the antenna ANT and the receiving circuit RX can be decreased. Meanwhile, when an inductor having a high impedance is used in place of the strip line 34, the same effects can be obtained.

Also, in the high-frequency switch 20, for preventing a current from flowing via the strip line 34 when voltages are applied to the first and the second control terminals 30 and 54, the capacitor 36 is connected to the strip line 34 in series. When the capacitor 36 is connected, the above equation for setting the inductance L of the strip line 34 is amended in response to a capacitance thereof, of course.

Furthermore, in the high-frequency switch 20, when receiving, the other end of the second strip line 40 is grounded via the capacitance component of the second diode 46 and so on. Thus, the characteristic impedance of the second strip line 40 will be decreased by the capacitance component of the second diode 46. However, since one end of the second strip line 40 is grounded via the capacitor 42, the characteristic impedance of the second strip line 40 is amended so as to increase by the capacitance component of the capacitor 42 at a prescribed frequency. Thus, when the capacitance component of the capacitor 42 is adjusted, the characteristic impedance of the second strip line 40 can match with the impedance of the receiving circuit RX side, and the insertion loss at receiving can be decreased.

Figure 7:
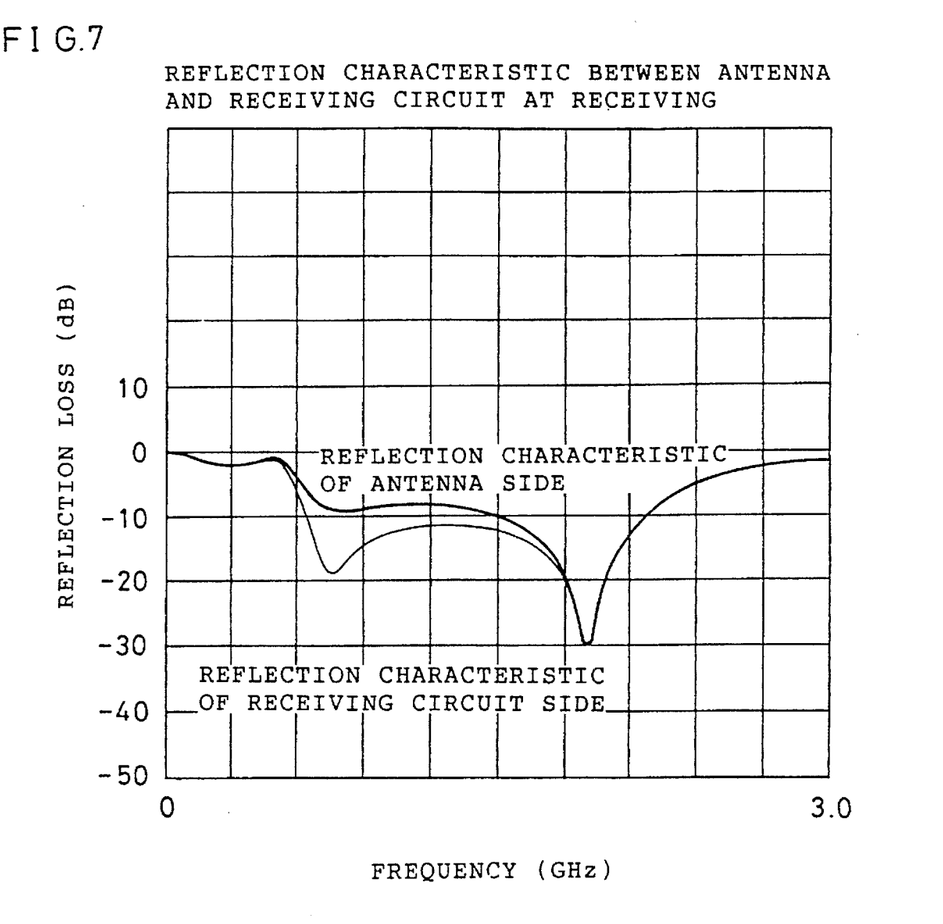
FIG. 7 is a graph showing a reflection characteristic between an antenna and a receiving circuit at receiving in the embodiment shown in FIG. 1.

In this case, since the capacitor 42 is formed between the electrode 64 and the first grounding electrode 66a, the capacitance of the capacitor 42 can be adjusted by trimming at least one of the electrodes 64 and 66a. By adjusting the capacitance of the capacitor 42, the characteristic impedance of the second strip line 40 can be adjusted, for example, within from 47 ohms to 82 ohms at the prescribed frequency. Thus, in the high-frequency switch 20, the characteristic impedance of the second strip line 40 can match with the impedance of the receiving circuit RX side, for example, 50 ohms at the prescribed frequency, as showing a reflection characteristic between the antenna and the receiving circuit at receiving when the above-mentioned matching in FIG. 7, the reflection loss at receiving becomes small, and the insertion loss at receiving can be decreased to, for example, −0.5 dB. Meanwhile, it is preferable that the capacitance of the capacitor 42 is adjusted to a capacitance similar to the capacitance component of the second diode 46 when OFF, since the characteristic impedance of the second strip line 40 can be easily adjusted to the impedance of the receiving circuit RX side.

Accordingly, the high-frequency switch 20 has good characteristics in both transmitting and receiving.

Also, in the high-frequency switch 20, compared with the high-frequency switch shown in FIG. 9, since both ends of the second strip line are grounded via the capacitance and so on, in order to obtain the same resonance characteristic with regard to the second strip line, the inductance component in the second strip line can be decreased, and the second strip line 40 can be shortened in length by about 15%, thus the whole switch becomes small.

Furthermore, in the high-frequency switch 20, since the first strip line 26, the second strip line 40 and so on are provided inside the laminate 60, and the first diode 24, the second diode 46 and so on are mounted on the top dielectric layer 62a of the laminate 60, compared with a case wherein these parts and so on are mounted on one substrate, the area is decreased and miniaturized in its plan view. Meanwhile, the first strip line 26 and the second strip line 40 may be formed on different dielectric layers of course.

Meanwhile, in the above-mentioned embodiment, the series circuit of the strip line 34 and the capacitor 36, and the resistor 38 are connected to the first diode 24 in parallel, the cathode of the second diode 46 is grounded via the capacitor 48, the resistor 50 is connected to the second diode 46 in parallel, and the second control terminal 54 is connected to the cathode of the second diode 46 via the resistor 52. However, the strip line 34, the capacitors 36 and 48, the resistors 38, 50 and 52, and the second control terminal 54 may not be provided. In this case, the cathode of the second diode 46 is directly grounded. Also, it is possible to modify the design within the purpose of the present invention, for example, the resistors and the diodes may be within the laminate 60.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A high-frequency switch connected to a transmitting circuit, a receiving circuit and an antenna, for switching a connection between said transmitting circuit and said antenna and a connection between said receiving circuit and said antenna, comprising:

a first diode whose anode is connected to said transmitting circuit and whose cathode is connected to said antenna;

a strip line connected between said antenna and said receiving circuit;

a second diode whose anode is connected to said receiving circuit and whose cathode is connected to a ground; and a capacitor connected between ground and a connecting point of said strip line and said antenna.

2. A high-frequency switch according to claim 1, wherein said anode of said first diode is connected to said transmitting circuit via a capacitor, said cathode of said first diode is connected to said antenna via a capacitor, said anode of said second diode is connected to said receiving circuit via a capacitor, and said cathode of said second diode is connected to ground via a capacitor.

3. A high-frequency switch according to claim 2, wherein a first control terminal is connected to said anode of said first diode, and a second control terminal is connected to cathode of said second diode.

4. A high-frequency switch according to claim 3, which further comprises a series circuit of an inductor and a capacitor, wherein said series circuit is connected to said first diode in parallel.

\* \* \* \* \*